United States Patent Office

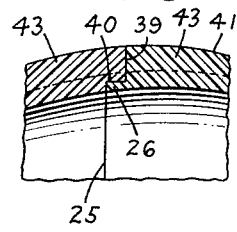
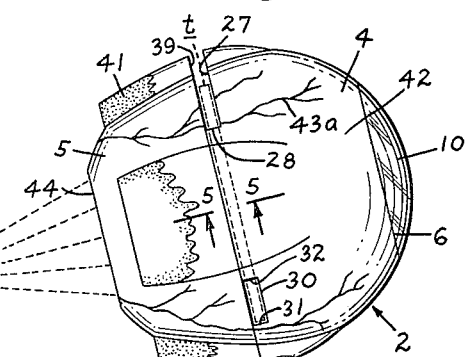
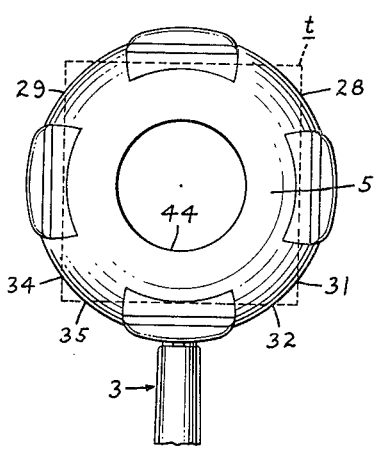
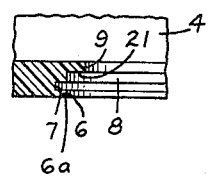
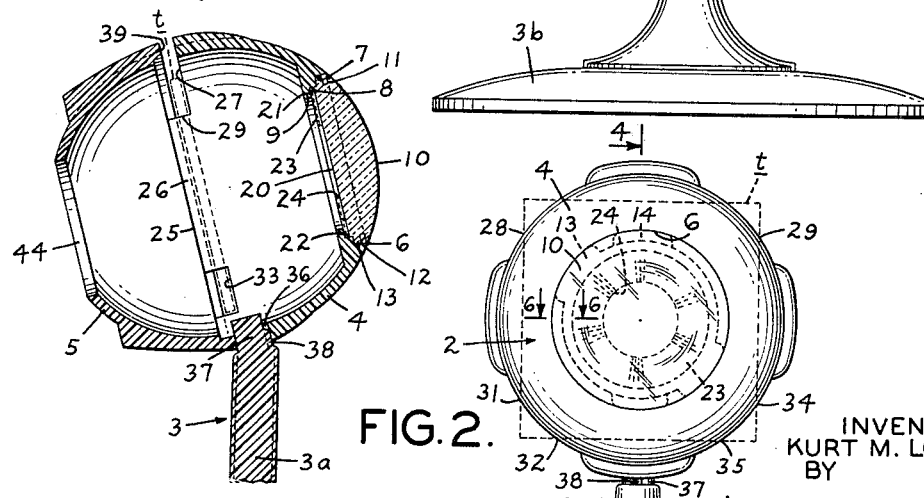

3,177,593
Patented Apr. 13, 1965

3,177,593
EYE DISPLAY AND VIEWER
Kurt M. Loeb, Ambler, Pa., assignor to American Home Products Corporation, New York, N.Y., a corporation of Delaware
Filed Nov. 5, 1962, Ser. No. 235,383
2 Claims. (Cl. 35—17)

The present invention relates generally to slide viewers and more particularly to a slide viewer in the form of a stylized representation of the human eye especially constructed to accommodate a transparent slide which may be viewed from outside said representation.

Various comparatively complicated optical devices have been proposed for illustrating mechanically, the phenomena which occur in the human system in the transmission of the perception of light to the brain from the normal and various types of malformed eyes; and to show refracted light in the interior of the human eye for the purpose of illustarting various optical defects therein and how lenses may be used to correct the optical defects. Other devices of a more inanimate structural nature have been used to disclose parts of the eye employed in the function of seeing and to enable in such structure the display of a curved image identical with the image projected upon the curved retina of the human eye in distinction from the flat image projected on the flat surface of a camera screen.

However, none of the foregoing and other prior art eye model devices, as far as I am aware, are particularly adapted to permit the insertion of removable slides into the body of the device and the viewing of the images provided by said slides within seemingly authentic environment via lens which simulates the cornea of the eye.

In consideration of the foregoing, it is a primary object of this invention to provide a model of the human eye that may function as an opthamological display and/or teaching device for illustrating external and internal pathological conditions of the eye.

It is another object of the invention to provide a model of the human eye specifically designed for receiving and mounting removable transparencies therein for viewing from the exterior thereof.

Another object is to provide such an eye model that has a lens which permits viewing of the images provided by the removable transparencies and functions as the cornea of the eye.

Yet another object is to provide an eye model wherein the cornea-simulating lens is easily removable from the device and may be positively locked in position on the device to retain a removable iris-simulating element therebehind.

It is yet another object of the invention to provide such a model wherein the main body thereof comprises two hollow generally hemispheric parts that are formed to permit facile joining to form the model.

Yet another object is to provide an eye model comprising said two hollow parts in which complementary muscle-simulating elements are integrally formed, and which parts are readily adaptable to mass production molding operations.

It is another object of the invention to provide a moldable model as referred to above wherein the means for mounting the removable transparencies is provided by novel cut-out portions without the necessity for additional structural pieces.

Another object is to provide an eye model having simple means for permitting its mounting on a stand or pedestal for display purposes and disassembly thereof for shipping or storage.

Another object is to provide an eye model transparency viewer having simple means for permitting lighting of a transparency mounted in the model for viewing.

The above and other objects and advantages of the invention are accomplished by the provision of an eye model and transparency viewer comprising generally a hollow shell having the general exterior shape of an eye, transparent lens forming the cornea of the eye at one end of the shell, the shell comprising means for supporting an image-forming transparency within the hollow shell in general alignment with the optical axis of the lens, and means for permitting light to inpinge upon an image-forming transparency, when supported in the shell, on the side of the side of the transparency opposite that which faces the lens.

In a preferred form of the invention, the eye model is a stylized representation of the human eye, roughly 2½ times enlarged to accommodate a 35 mm. image-bearing slide. The cornea of the eye is provided as a transparent lens, preferably molded in clear Plexiglas and, in its function, enlarges the slide image to bring it, at least roughly, into proportion with the external anatomy represented by the exterior of the eye model. Advantageously, the cornea lens is detachable from the viewer body to render the iris element accessible and also removable. Thus, the iris may be replaced at will to show pathologies thereof or different degrees of dilation of the pupil, through which the image provided on the slide may be viewed. Preferably, the iris is a die-cut photograph or illustration depicting the desired iris image.

The eye model is preferably mountable on and detachable from a gracefully curvilinear stand or pedestal of clear plastic. Preferably, one of the hemispheric shells making up the model per se is provided with a keyed aperture to receive the complementary short stem provided for such purpose on the upper end of the pedestal.

A better understanding of the invention will be had upon reading the description of a preferred embodiment thereof described below with reference to the drawings wherein FIG. 1 is a side elevation of an eye model and viewing device, in accordance with the invention, shown mounted on a stand or pedestal.

FIG. 2 is a front elevation of the device of FIG. 1, only a small upper part of the pedestal being shown, FIG. 3 is a rear elevation of the device of FIGS. 1 and 2, the pedestal again being shown only partially.

FIG. 4 is a vertical cross-section of the device of FIGS. 1–3, the section being taken on line 4—4 of FIG. 2, but with the lens positioned as originally inserted in the device and prior to rotation thereof to the locking position illustrated in FIG. 2, FIG. 5 is a fragmentary generally horizontal section of an area of the joint between the two generally hemispherically shaped halves of the model, the section being taken on line 5—5 of FIG. 1, and FIG. 6 is a fragmentary horizontal section taken transversely of the edge of the lens mounting aperture in the front half of the model, the section being taken on line 6—6 of FIG. 2, but with the lens and iris member removed.

Referring to said figures, the device disclosed therein comprises the eye model and viewer 2 and a pedestal 3 therefor. The viewer 2 comprises a front hollow generally hemispherical section 4 and a rear hollow generally hemispherical section 5. Section 4 is provided at its forward end with a circular aperture 6. Aperture 6 is provided, inwardly of its juncture with the external surface of section 4, with a radially extending circumferential groove 7 which, in effect, defines around aperture 6, a retention flange or ledge 6a. A first inwardly stepped shoulder 8 extends from the inner edge of groove 7 a predetermined distance to terminate at its juncture with surface 21 which extends substantially perpendicularly to shoulder 8 and toward the center of aperture 6. A second inwardly stepped shoulder 9 extends inwardly from the inner end of said surface 21 to the interior surface of section 4.

Removably mounted in aperture 6 of section 4 is a convex optical lens 10 of transparent plastic material. The circumferential periphery of lens 10 is provided with a reduced circumference 11 defined rearwardly of the peripheral edge 12 of the convex surface of lens 10. Integrally formed on the body of said lens and extending radially of the median region of said reduced circumference 11 thereof and diametrically opposite each other, are a pair of lugs 13.

To permit seating of lens 10 in aperture 6 of section 4 by allowing passage of said lugs 13 of lens 10 past said ledge 6a, the latter is discontinuous to form a pair of vertically diametrically opposite cut-outs 14 each of a width in the circumferential direction slightly greater than the comparable width of said lugs 13 of lens 10.

The axial thickness of lens 10 is so dimensioned that when it is properly seated in groove 7 in aperture 6, the flat rear surface 20 of lens 10 may be spaced from the front surface 21 of shoulder 9 to provide an annular space 22. Positioned in annular space 22 is an iris element 23 having a central aperture 24 functioning as the pupil thereof.

The rear edge 25 of front hollow section 4 terminates in an interior flange 26 of diminished cross-sectional thickness for a purpose to be described hereinafter. For another purpose that will also appear presently, the upper portion of flanged edge 25 has a large slot 27 therein extending from an edge 28 at one side of section 4 over the top of said section to an edge 29 at the other side thereof. A first smaller slot 30 is provided in the lower portion of rear edge 25 and extends from edge 31 to edge 32. Opposed to slot 30 and located in rear edge 25 on the other side of section 4, is a second smaller slot 33 extending from edge 34 to edge 35. Finally, section 4 is provided with a keyed bottom aperture 36 adapted to receive reduced stem 37 of pedestal 3 and key protrusion 38 thereof.

Hollow section 5 is dimensioned to complete the general eye configuration of the eye model when assembled with hollow section 4 as shown in FIG. 1. For the purpose of assembly, section 5 is provided with a peripheral edge 39 complementary to edge 25 of section 4. To this end, edge 39 has the similarly dimensioned thickness reduced by one-half to provide an exterior flange 40. With sections 4 and 5 in assembled relationship, as best seen in FIG. 5, flanges 26 and 40 overlap in a friction fit. As seen in FIG. 1, the outer surfaces of shells 4 and 5 are contoured to simulate the four rectus muscles 41 and are colored to indicate the sclera 42 and blood vessels 43a thereon. Muscles 41 are depicted by complementary thickenings 43 molded into the bodies of hollow sections 4 and 5. Finally the rear of section 5 is provided with an aperture 44.

In the production of the device, sections 4 and 5 thereof may be separately molded with their respective integral structures, slots, apertures and flanges described above. The pedestal 3 may also be separately molded and comprises said upper stem 37 integrally molded with key protrusion 38 and an elongate shank 3a tapering outwardly at the bottom and fixedly mounted on a separate base portion 3b.

Device 2 is assembled by joining sections 4 and 5 by engagement of flanges 26 and 40 thereof. Said flanges are preferably permanently joined by an adhesive applied prior to assembly. The completed generally spherical shell may then be mounted on pedestal 3 by threading keyed aperture 36 of section 4 onto keyed stem 37 of pedestal 3. An iris element 23 of chosen appearance and desired pupil aperture 24 may then be placed within tween shoulders 8 and 9, after which lens 10 may be shoulder 8 and against radial surface 21 extending be inserted into aperture 6 so that each of said lugs 13 respectively fits within one of said cut-outs 14. The lens 10 is then rotated (say counterclockwise one-quarter revolution as shown) to cause lugs 13 to ride behind ledge 6a and thereby cause locking of lens 10 to the shell 4 with iris 23 retained therebehind. A light source l may then be positioned behind aperture 44 in shell 5. The transparency t to be viewed (shown in phantom in the figures) may then be inserted through upper slot 27 and positioned with each of the bottom corners thereof respectively protruding through one of the bottom slots 30 and 33. The transparency t is thus properly aligned for viewing through lens 10. Lens 10 may be removed at any time, for example to permit replacement of iris 23 with another iris of different appearance or for any other reason, by merely rotating lens 10 in aperture 6 until lugs 13 thereon realign with cut-outs 14 to permit axial withdrawal or pushing of lens 10 from aperture 6. Transparency t is removable by merely lifting it out of upper slot 27 to permit replacement, for example, with another transparency having a differing (retinal) image thereon.

In a practical application of the invention, the body of the eye model is preferably stylized and simplified, but not medically inaccurate. For example, while the human eye is not perfectly spherical, the model, preferably approaches such form to facilitate molding production. The color of the sclera may desirably be approximated in the model, and the network of major blood vessels shown on the exterior surface thereof. The blood vessels, however, are also preferably modified in line with the general stylization which, for example, omits the optic nerve in the model form. These stylizations and simplifications have been found desirable in the production of the model because of the functional nature thereof, the problems otherwise inherent in production of the model, and also for purely aesthetic reasons. For these same reasons, preferably only the four muscles, the rectus superior, rectus inferior, rectus medialis and rectus lateralis, are partially shown. Thus, it has been found expedient to omit the obliquus superior and obliquus inferior, and particularly for the reasons that inclusion of the latter muscles would create considerable technical problems in mass production and hence overall cost. On the other hand, the four rectus muscles may be shown from their accurate points of insertion on the eye ball to a point approximately one-third from the rear of the eye, and their ligamentous attachment to the eye may also be shown.

The device of the invention has been found by eminent opthalmologists to be an excellent means for teaching the use of the opthalmoscope to students and nurses, which normally presents a considerable problem. Its usefulness for showing retinal pathologies will be obvious and has also been demonstrated. Moreover, many opthalmologists, since the development of the retina camera, take their own transparencies, often routinely. By means of the device of the present invention, the retinal images provided by such transparencies may now be viewed in relation to their anatomical environment. The invention has also been found to provide a practical teaching device for the physician and for patient instruction.

The detachable iris makes the model still more versatile since many pathologies not related to the retina may thus be shown. The eye, rightly considered the diagnostic window of many disorders and diseases, is not only of value to the specialist but to doctors in general. Thus, it may be of extreme value to provide the doctor with an anatomical model in accordance with the invention, plus a teaching slide library aimed particularly at the doctor's area of specialization.

As will readily appear to those skilled in the art, various modifications and embodiments of the invention may be made without departing from the spirit thereof as appears herein nor from the scope thereof as defined in the appended claims.

I claim:

1. An eye model and transparency viewer comprising a hollow shell having the general exterior shape of an eye, a circular aperture defined by mounting means at one end of said shell, said mounting means comprising an inner retention ledge extending inwardly of the aperture and terminating a first predetermined distance from the center of the aperture and a pair of opposed outer retention ledges also extending inwardly of the aperture and terminating a second predetermined distance from the center of the aperture which is further from the center than is said first predetermined distance, a removable centrally apertured iris member supported in said apertured mounting means, said iris member having a diameter greater than said first predetermined distance and lesser than said second predetermined distance and abutting said inner retention ledge, a removable transparent lens forming the cornea of said eye also mounted in said apertured mounting means exteriorly of said iris member in optical alignment therewith, said transparent lens having a diameter greater than that of said iris member and having at least a peripheral portion thereof extending between said pair of opposed outer retention ledges, said shell comprising means for supporting an image-forming transparency within said hollow shell in general alignment with the aperture of said iris member and the optical axis of said lens, and means for permitting light to impinge on an image-forming transparency when supported in said shell on the side of the transparency opposite that which faces said iris member and said lens.

2. An eye model and transparency viewer comprising:
(A) a hollow shell having the general exterior shape of an eye,
  (1) said shell comprising a first half of generally hemispherical configuration and a second half of generally hemispherical configuration complementary with said first half,
  (2) said first and second shell halves each having an enlarged aperture therein located remotely from the edge of the respective shell half, whereby said enlarged apertures are axially aligned,
  (3) said shell halves having:
    (a) complementary thickenings on the exterior surfaces thereof which coact to simulate muscles of the eye and function as strengthening ribs, with
    (b) said edges of said shell halves being of complementary reduced thicknesses to provide an overlapping and underlapping engagement therebetween,
  (4) a removable transparent lens simulating the cornea of the eye and positioned in said enlarged aperture of said first shell half,
  (5) said shell halves having means for supporting an image-forming transparency within said hollow shell and in general alignment with the axis of said apertures and the optical axis of said lens,
  (6) said means comprising a plurality of slots defined in said edge of reduced thickness of one of said shell halves,
  (7) said slots comprising:
    (a) an upper slot elongated in the direction of said edge of said shell half and adapted to permit insertion therein of an image-forming transparency, and
    (b) two opposed smaller slots each adapted to receive respectively one lower corner of the image-forming transparency inserted in said upper slot,
  (8) said one shell half having in the bottom region thereof, a smaller aperture provided with key means; and
(B) a stand having the upper end thereof provided with key means complementary to and inserted in said keyed smaller aperture, whereby said shell is retained on said stand in non-rotatable relationship thereto.

References Cited by the Examiner

UNITED STATES PATENTS

| | | | |
|---|---|---|---|
| 1,535,163 | 4/25 | Kintner | 35—17 |
| 1,582,199 | 4/26 | Walters | 35—17 |
| 1,881,602 | 10/32 | Hughes | 35—17 |
| 2,068,950 | 1/37 | Hamilton | 35—17 |
| 2,630,642 | 3/53 | Mast et al. | 40—63 |

OTHER REFERENCES

Denoyer-Geppert Co. Catalog No. 21B, 1946–47, QH 324.5.D4, page 5 relied on.

JEROME SCHNALL, *Primary Examiner.*

GEORGE A. NINAS, JR., *Examiner.*